Patented June 24, 1930

1,766,304

UNITED STATES PATENT OFFICE

GRIGORI PETROFF, OF MOSCOW, UNION OF SOVIET SOCIALIST REPUBLICS

PROCESS FOR SEPARATING AND PURIFYING SULPHO-ACIDS OF HIGH MOLECULAR WEIGHT

No Drawing. Application filed April 23, 1927, Serial No. 186,180, and in Union of Soviet Socialist Republics November 26, 1926.

As is known, sulpho-acids of high molecular weight, such as for instance octo-hydro-anthracene-sulpho-acid, which are obtained by sulphonating hydrogenated anthracene, as well as the sulpho-acids obtained by sulphonating naphtha hydrocarbons, the sulpho-aromatic fatty acids (Twitschel's reagent, "Pfeil-Ring" reagent) the sulpho-acids obtained by sulphonating the hydrocarbons of the terpene series, such as for instance turpentine (cymene-sulphonic acids) or turpentine with oleic acid (cymene splitting agent) contain, when they are prepared, a series of undesirable impurities, such as for instance free oils, hydrocarbons, free sulphuric acid, various acids, resinous constituents, sulphones and the like. Moreover the sulpho-acids produced for instance by sulphonating naphtha distillates often consist of a mixture of acids of high molecular weight with acids of low molecular weight.

Such sulpho-acids can be directly freed from the admixed oils, hydrocarbons, resinous constituents and free sulphuric acid by dissolving in water, or in solutions of alcohol and water or in alcohol. This process does not entirely fulfill its purpose, and the precipitation of the acids by direct conversion of the same into salts by means of alkalies, is also not entirely effective.

I have found by experiment, that good technical results are obtained when these acids are treated as follow.

Aqueous solutions or solutions in water and alcohol of the sulpho-acids are mixed with hydrocellulose, wood powder, finely ground sawdust or other porous cellulose. The cellulose which contain impurities must be freed beforehand from any salt and resinous constituents present therein.

After mixing until dry, the mass is dried at a temperature not exceeding 50–60° C. until the weight is constant, and the dry sawdust extracted successively by the solvents benzine, benzene and alcohol. By treating with benzine, mineral oils, a part of the resinous substances and sulphones are extracted, by further treatment with benzene and alcohol, the sulpho-acids are separated out, while the sulphuric acid is adsorbed by the cellulose.

After distilling off the benzene and alcohol, the sulpho-acids are obtained. Sulpho-acids are also obtained from the benzine solution by leaching out by means of alkalies or solvents, such as water, alcohol, or a mixture of the same, whereupon the benzine is distilled off.

Example 1.—40 parts of black naphtha-sulpho-acids, obtained from acid tarry matter, after the sulphonation of the distillate of spindle oil, in the form of aluminium salts, which were decomposed by sulphuric acid, and 60 parts of the wood powder are intimately mixed together, dried at 50–60° C. and thereupon extracted for 10 hours with benzine. After the latter is distilled off 40% of a black resinous product insoluble in water is obtained.

After the extraction with benzine the wood powder is extracted for another 8 hours with benzene, and after the latter has been distilled off, 8.2 parts of sulpho-acids soluble in water are obtained.

After a further extraction with alcohol for 10 hours, an additional 30% of sulpho-acids are obtained. The wood powder remains dark in colour and absorbs the majority of the sulphuric acid.

Example 2.—8 parts of sulpho-acid, known under the name of "idrapidspalter" (octo-hydro-anthracene-sulpho-acid) and 35 parts of hydrocellulose, obtained by treating commercial cellulose with naphtha-sulpho-acids, are thoroughly mixed together and dried. After extracting with benzine and distilling off the benzine, 40.4 parts of hard substances (sulpho-acids with resinous substances and neutral hydrocarbons) are obtained, after the extraction with benzene 17.4 parts of pure sulpho-acids and after the extraction with alcohol 30% sulpho-acids.

By using the said solvents the sulpho-acids can be freed from impurities and be separated according to the solvent used.

Owing to their definite specific properties, the purified and separated sulpho-acids can be used for special purposes in the art.

Having now particularly described and ascertained the nature of my said invention and in what manner the same is to be performed, I declare that what I claim is:—

1. A process of purifying and separating sulpho acids of high molecular weight which comprises mixing a solution of the sulpho acids with cellulose in porous condition, drying the mixture, extracting the mixture with a solvent for the impurities in the sulpho acids to free the latter from said impurities, and then extracting the residue with a solvent for the sulpho acids.

2. In the process of purifying and separating sulpho acids of high molecular weight, the step which comprises mixing the sulpho acids in solution with cellulose in porous form.

3. The process as in claim 2 in which the cellulose used is sawdust.

4. A process of purifying and separating sulpho acids of high molecular weight which comprises mixing a solution of the sulpho acids with cellulose in porous condition, drying the mixture, extracting the mixture with a solvent for the impurities in the sulpho acids to free the latter from said impurities, extracting the residue with benzine to dissolve the sulpho acids, and then recovering the acids from said benzine solution.

In testimony whereof I have signed my name to this specification.

GRIGORI PETROFF.